(12) United States Patent
Hummel et al.

(10) Patent No.: US 7,653,803 B2
(45) Date of Patent: Jan. 26, 2010

(54) ADDRESS TRANSLATION FOR INPUT/OUTPUT (I/O) DEVICES AND INTERRUPT REMAPPING FOR I/O DEVICES IN AN I/O MEMORY MANAGEMENT UNIT (IOMMU)

(75) Inventors: Mark D. Hummel, Franklin, MA (US);
Geoffrey S. Strongin, Austin, TX (US);
Mitchell Alsup, Austin, TX (US);
Michael Haertel, Sunnyvale, CA (US);
Andrew W. Lueck, Austin, TX (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 446 days.

(21) Appl. No.: 11/623,500

(22) Filed: Jan. 16, 2007

(65) Prior Publication Data

US 2007/0168643 A1    Jul. 19, 2007

Related U.S. Application Data

(60) Provisional application No. 60/759,826, filed on Jan. 17, 2006.

(51) Int. Cl.
*G06F 12/10* (2006.01)
(52) U.S. Cl. .................................. 711/207; 711/206
(58) Field of Classification Search ........................ None
See application file for complete search history.

(56) References Cited

U.S. PATENT DOCUMENTS 4,155,119 A * 5/1979 De Ward et al. ............ 711/206
4,218,743 A * 8/1980 Hoffman et al. ............ 711/207
4,550,368 A 10/1985 Bechtolsheim
5,301,287 A 4/1994 Herrell et al.
5,890,220 A * 3/1999 Mochida et al. ............ 711/206
5,949,436 A 9/1999 Horan et al.
5,987,557 A 11/1999 Ebrahim
6,886,171 B2 4/2005 MacLeod
7,370,137 B2 * 5/2008 Regnier ....................... 711/6
7,370,174 B2 * 5/2008 Arizpe et al. ............... 711/206
7,444,493 B2 * 10/2008 Schoinas et al. ............ 711/206
7,487,327 B1 * 2/2009 Chang et al. ................ 711/203

(Continued)

OTHER PUBLICATIONS

U.S. Appl. No. 11/623,526, filed Jan. 16, 2007, entitled "Using an IOMMU to Create Memory Archetypes".

(Continued)

*Primary Examiner*—Jack A Lane
(74) *Attorney, Agent, or Firm*—Lawrence J. Merkel; Meyertons, Hood, Kivlin, Kowert & Goetzel, P.C.

(57) ABSTRACT

In an embodiment, an input/output (I/O) memory management unit (IOMMU) comprises at least one memory configured to store translation data; and control logic coupled to the memory and configured to translate an I/O device-generated memory request using the translation data. The translation data corresponds to one or more device table entries in a device table stored in a memory system of a computer system that includes the IOMMU, wherein the device table entry for a given request is selected by an identifier corresponding to the I/O device that generates the request. The translation data further corresponds to one or more I/O page tables, wherein the selected device table entry for the given request includes a pointer to a set of I/O page tables to be used to translate the given request.

19 Claims, 8 Drawing Sheets

U.S. PATENT DOCUMENTS

| | | | |
|---|---|---|---|
| 7,516,247 B2 * | 4/2009 | Hummel et al. | 710/15 |
| 7,543,131 B2 * | 6/2009 | Hummel et al. | 711/202 |
| 2006/0075146 A1 | 4/2006 | Schoinas et al. | |
| 2006/0149919 A1 * | 7/2006 | Arizpe et al. | 711/206 |
| 2006/0277348 A1 | 12/2006 | Wooten | |
| 2006/0277357 A1 * | 12/2006 | Regnier | 711/6 |

OTHER PUBLICATIONS

Motorola, "Power PC 601, RISC Microprocessor User's Manual", 1993, Chapter 6, "Memory Management Unit", pp. 1-64, International Business Machines Corporation.

AMD, "AMD x86-64 Architecture Programmer's Manual", Sep. 2002, Chapter 5, "Page Translation and Protection", pp. 143-176.

* cited by examiner

| Lint1P | Lint0P | IntCtl[1:0] | NMIP | EIntP | INITP | IntTablePtr [51:6] | IG |

| IntTableLen [3:0] | IV | SysMgt [1:0] | IoCtl [1:0] | DomainID [15:0] | PageTablePtr [51:12] | TV | V |

| 63 | 62 | N  N-1 | 52  51 | 32 |
|---|---|---|---|---|
| I | Archetype | Reserved | Addr[51:32] | |

84

| 31 | 12 11 | 9  8 | 1  0 |
|---|---|---|---|
| Addr[31:12] | NxtLvl | Reserved | 1 |

| 62 | 61 | 60 | 59 | 58 | 57 | 56 |
|----|----|----|----|----|----|----|
| IW | IR | FC | U  | PF | DP | TR |

84a

| 63 | 62 | N N-1 | 52 | 51 | 32 |
|----|----|-------|----|----|----|
| I | Archetype | | Reserved | | Addr[51:32] |

| 31 | 12 | 11  9 | 8 | 1 | 0 |
|----|----|-------|---|---|---|
| Addr[31:12] | | NxtLvl | Reserved | | 1 |

82

| 63 | 62 | 52 | 51 | 32 |
|----|----|----|----|----|
| NX | Available | | Addr[51:32] | |

| 31 | 12 | 11  9 | 8 | 1 | 0 |
|----|----|-------|---|---|---|
| Addr[31:12] | | AVL | Attributes | | 1 |

ADDRESS TRANSLATION FOR INPUT/OUTPUT (I/O) DEVICES AND INTERRUPT REMAPPING FOR I/O DEVICES IN AN I/O MEMORY MANAGEMENT UNIT (IOMMU)

This application claims benefit of priority to U.S. Provisional Patent Application Ser. No. 60/759,826, filed on Jan. 17, 2006.

BACKGROUND

1. Field of the Invention

This invention is related to the field of computer systems, and more particularly memory management mechanisms for input/output (I/O) device-initiated requests.

2. Description of the Related Art

Computer systems of various types are ubiquitous in modern society, including personal computers (PCs), workstations, servers, various personal digital assistant (PDA) devices, etc. Most, if not all, of these computer systems have implemented memory management functionality for processor accesses to memory. Generally, the memory management functionality has included translating addresses from a virtual address space used by each process to a physical address space that spans the actual system memory, along with various memory protections (e.g. read only, read/write, privilege level requirements, etc.). The memory management functionality has a variety of uses: protecting the memory used by each process from unauthorized access by other processes; permitting large virtual spaces to be used by processes even if the physical memory system is not that large; relocation of virtual addresses to available physical memory without the participation of the process; etc.

While the processor addresses are frequently translated, addresses used by input/output (I/O) devices in computer systems are generally not translated. That is, the I/O devices use physical addresses to access memory. In a single operating system (OS) computer system, such as most PCs, the OS controls access to the I/O devices by other processes (applications and OS services). Accordingly, the OS can control which process has access to a given device at any given point in time, and can at least somewhat control the addresses accessed by the device. However, such mechanisms become more complicated and cumbersome in virtual machine systems, which may have multiple guest OSs running on a virtual machine monitor. Additionally, devices' use of physical addresses reduces the overall security of the system, since a rogue device (or a device programmed by a malicious software agent) can access memory unimpeded.

I/O devices often perform large memory transfers (referred to as direct memory access (DMA) transfers). Accordingly, performance in the system may be strongly impacted by the optimization of the DMA transfers and corresponding data.

SUMMARY

In an embodiment, an input/output (I/O) memory management unit (IOMMU) comprises at least one memory configured to store translation data; and control logic coupled to the memory and configured to translate an I/O device-generated memory request using the translation data. The translation data corresponds to one or more device table entries in a device table stored in a memory system of a computer system that includes the IOMMU, wherein the device table entry for a given request is selected by an identifier corresponding to the I/O device that generates the request. The translation data further corresponds to one or more I/O page tables, wherein the selected device table entry for the given request includes a pointer to a set of I/O page tables to be used to translate the given request. In one embodiment, a system comprises a memory system storing the device table and the one or more input/output (I/O) page tables during use, at least one I/O device configured to generate a memory request, and the IOMMU coupled to the I/O device and the memory system.

In one embodiment, a method comprises receiving an input/output (I/O) device-generated memory request in an IOMMU; determining a device table entry corresponding to the memory request by the IOMMU; determining a set of I/O page tables corresponding to the memory request responsive to the device table entry; and translating the memory request using translation data corresponding to the device table entry and the set of I/O page tables.

BRIEF DESCRIPTION OF THE DRAWINGS

The following detailed description makes reference to the accompanying drawings, which are now briefly described.

FIG. 4 is a block diagram of one embodiment of a device table entry for a device table shown in FIG. 3.

FIG. 5 is a block diagram of one embodiment of a page table entry for an I/O page table shown in FIG. 3.

FIG. 9 is a block diagram illustrating one embodiment of an I/O page table entry and a CPU page table entry.

Figure 1:
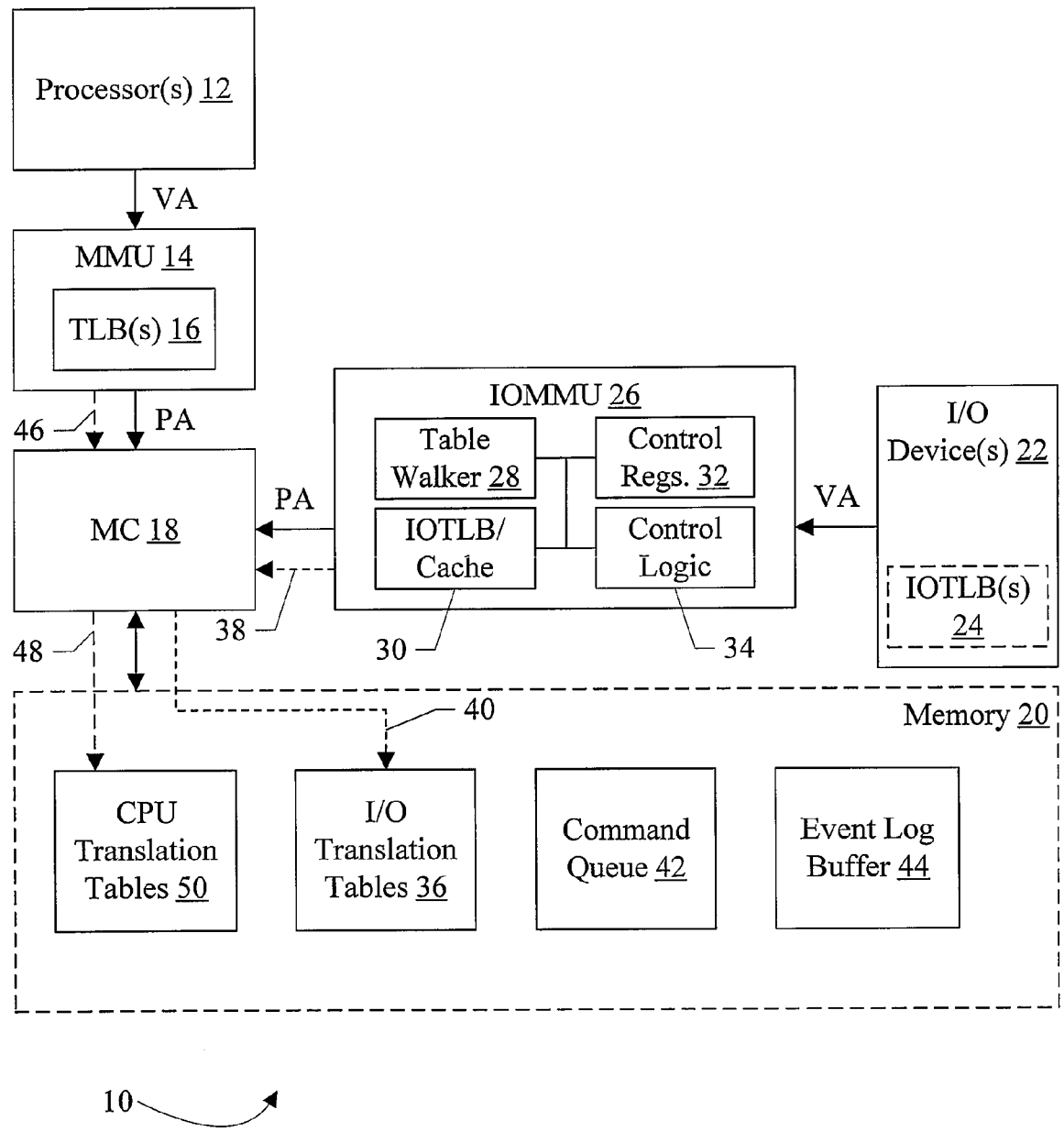
FIG. 1 is a block diagram of a high level view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 is a block diagram illustrating a simplified, high level view of one embodiment of a computer system 10. In the illustrated embodiment, the system 10 includes one or more processors 12, a memory management unit 14 comprising one or more translation lookaside buffers (TLBs) 16, a memory controller (MC) 18, a memory 20, one or more I/O devices 22 which may comprise one or more I/O TLBs (IOTLBs) 24, and an I/O MMU (IOMMU) 26 which may comprise a table walker 28, an IOTLB/cache 30, control registers 32, and control logic 34. The processors 12 are coupled to the MMU 14, which is coupled to the memory controller 18. The I/O devices 22 are coupled to the IOMMU 26, which is coupled to the memory controller 18. Within the IOMMU 26, the table walker 28, the IOTLB 30, the control registers 32, and the control unit 34 are coupled.

As illustrated in FIG. 1, the path from the I/O devices 22 to the memory 20 is at least partially separate from the path of the processors 12 to the memory 20. Specifically, the path from the I/O devices 22 to memory 20 does not pass through the MMU 14. Accordingly, the MMU 14 may not provide memory management for the memory requests sourced from the I/O devices 22. Generally, memory management may comprise address translation from a virtual address (VA in FIG. 1) to a physical address (PA in FIG. 1) and memory protection. Memory protection may control read and/or write access to the memory at some level of granularity (e.g. a page), along with various other attributes such as privilege level requirements, cacheability and cache controls (e.g. writethrough or writeback), coherency, etc. Any set of memory protections may be implemented in various embodiments. In some embodiments, the memory protections implemented by the IOMMU 26 may differ from the memory protections implemented by the MMU 14, in at least some respects. In one embodiment, the memory protections implemented by the IOMMU 26 may be defined so that the translation tables storing the translation data used by the IOMMU 26 and the MMU 14 may be shared (although shown separately in FIG. 1 for ease of discussion). Other embodiments may not share translation tables between the IOMMU 26 and the MMU 14, as desired.

Specifically, for one embodiment, the I/O translation tables 36 may include an archetype field that defines various attributes for the translation and/or the corresponding page. Various attributes may be defined in various embodiments. Several embodiments are described in more detail below.

Generally, the I/O devices 22 may be configured to generate memory requests, such as memory read and write requests, to access memory locations in the memory 20. The memory requests may be part of a direct memory access (DMA) read or write operation, for example. The DMA operations may be initiated by software executed by the processors 12, programming the I/O devices 22 directly or indirectly to perform the DMA operations. Among other things, the I/O devices 22 may be provided with virtual addresses to access the memory 20. The virtual addresses may be translated by the IOMMU 26 to corresponding physical addresses to access the memory, and the physical addresses may be provided to the memory controller 18 for access. That is, the IOMMU 26 may modify the memory requests sourced by the I/O devices 22 to change the virtual address in the request to a physical address, and the memory request may be forwarded to the memory controller 18 to access the memory 20.

The IOMMU uses a set of I/O translation tables 36 stored in the memory 20 to translate the addresses of memory requests from the I/O devices 22. Generally, translation tables may be tables of translation data that can be used to translate virtual addresses to physical addresses. The translation tables may store the translation data in any fashion. For example, in one embodiment, the I/O translation tables 36 may include page tables similar to those defined in the x86 and AMD64™ instruction set architectures. Various subsets of the virtual address bits may be used to index levels of the table, and each level may either be the end of translation (i.e. storing a real page number for the translation) or may point to another table (indexed by another set of virtual address bits). The page may be the unit of translation (i.e. each address in the virtual page translates to the same physical page). Pages may have varying sizes, from 4 kilobytes up to Megabytes or even Gigabytes.

Additionally, the translation tables 36 may include a device table that maps devices to sets of page tables (e.g. by device identifier). The device identifier (ID) may be defined in a variety of ways, and may be dependent on the peripheral interconnect to which the device is attached. For example, Peripheral Component Interconnect (PCI) devices may form a device identifier from the bus number, device number and function number. HyperTransport™ devices may use a bus number and unit ID to form a device identifier. Thus, in general, a translation from a virtual address to a physical address may be stored in one or more entries in one or more translation tables, and some of the entries may be shared with other translations. Traversing the tables from entry to entry may be part of identifying the translation for the virtual address. In one embodiment, the translation tables 36 may include an interrupt remapping table to remap interrupts signalled by the I/O devices 22 (e.g. via MSIs, and address range associated with interrupt operations, etc.).

Specifically, the IOMMU 26 illustrated in FIG. 1 may include the table walker 28 to search the I/O translation tables 36 for a translation for a given memory request. The table walker 28 may generate memory requests, e.g. read memory requests, to read the translation data from the translation tables 36. The translation table reads are illustrated by dotted arrows 38 and 40 in FIG. 1.

To facilitate more rapid translations, the IOMMU 26 may cache some translation data. For example, the IOTLB 30 maybe a form of cache, which caches the result of previous translations, mapping virtual page numbers to real page numbers and corresponding translation data. If a translation is not found in the IOTLB 30 for the given memory request, the table walker 28 may be invoked. In various embodiments, the table walker 28 may be implemented in hardware, or in a microcontroller or other processor and corresponding executable code (e.g. in a read-only memory (ROM) in the IOMMU 26). Additionally, other caches may be included to cache page tables, or portions thereof, and/or device tables, or portions thereof, as part of IOTLB/cache 30. Accordingly, the IOMMU 26 may include one or more memories to store translation data that is read from, or derived from, translation data stored in the memory 20.

The control logic 34 may be configured to access the IOTLB 30 to detect a hit/miss of the translation for a given memory request, and may invoke the table walker. The control logic 34 may also be configured to modify the memory request from the I/O device with the translated address, and to forward the request upstream toward the memory controller. Additionally, the control logic 34 may control various functionality in the IOMMU 26 as programmed into the control registers 32. For example, the control registers 32 may define an area of memory to be a command queue 42 for memory management software to communicate control commands to the IOMMU 26, in this embodiment. The control logic 34 may be configured to read the control commands from the command queue 42 and execute the control commands. Similarly, the control registers 32 may define another area of memory to be an event log buffer 44. The control logic 34 may detect various events and write them to the event log buffer 44. The events may include various errors detected by the control logic 34 with respect to translations and/or other functions of the IOMMU 26. The control logic 34 may also implement other features of the IOMMU 26, such as the archetype handling and translation processing described herein.

The I/O devices 22 may comprise any devices that communicate between the computer system 10 and other devices, provide human interface to the computer system 10, provide storage (e.g. disk drives, compact disc (CD) or digital video disc (DVD) drives, solid state storage, etc.), and/or provide enhanced functionality to the computer system 10. For example, the I/O devices 22 may comprise one or more of: network interface cards, integrated network interface functionality, modems, video accelerators, audio cards or integrated audio hardware, hard or floppy disk drives or drive controllers, hardware interfacing to user input devices such as keyboard, mouse, tablet, etc., video controllers for video displays, printer interface hardware, bridges to one or more peripheral interfaces such as PCI, PCI express (PCIe), PCI-X, USB, firewire, SCSI (Small Computer Systems Interface), etc., sound cards, and a variety of data acquisition cards such as GPIB or field bus interface cards, etc. The term "peripheral device" may also be used to describe some I/O devices.

In some cases, one or more of the I/O devices 22 may also comprise an IOTLB, such as IOTLBs 24. These IOTLBs may be referred to as "remote IOTLBs", since they are external to the IOMMU 26. In such cases, the memory requests that have already been translated may be marked in some fashion so that the IOMMU 26 does not attempt to translate the memory request again.

The memory controller 18 may comprise any circuitry designed to interface between the memory 20 and the rest of the system 10. The memory 20 may comprise any semiconductor memory, such as one or more RAMBUS DRAMs (RDRAMs), synchronous DRAMs (SDRAMs), DDR SDRAM, static RAM, etc. The memory 20 may be distributed in a system, and thus there may be multiple memory controllers 18.

The MMU 14 may comprise a memory management unit for memory requests sourced by a processor 12. The MMU may include TLBs 16, as well as table walk functionality. When a translation is performed by the MMU 14, the MMU 14 may generate translation memory requests (e.g. shown as dotted arrows 46 and 48 in FIG. 1) to the CPU translation tables 50. The CPU translation tables 50 may store translation data as defined in the instruction set architecture implemented by the processors 12.

The processors 12 may comprise any processor hardware, implementing any desired instruction set architecture. In one embodiment, the processors 12 implement the x86 architecture, and more particularly the AMD64™ architecture. Various embodiments may be superpipelined and/or superscalar. Embodiments including more than one processor 12 may be implemented discretely, or as chip multiprocessors (CMP) and/or chip multithreaded (CMT).

Figure 2:
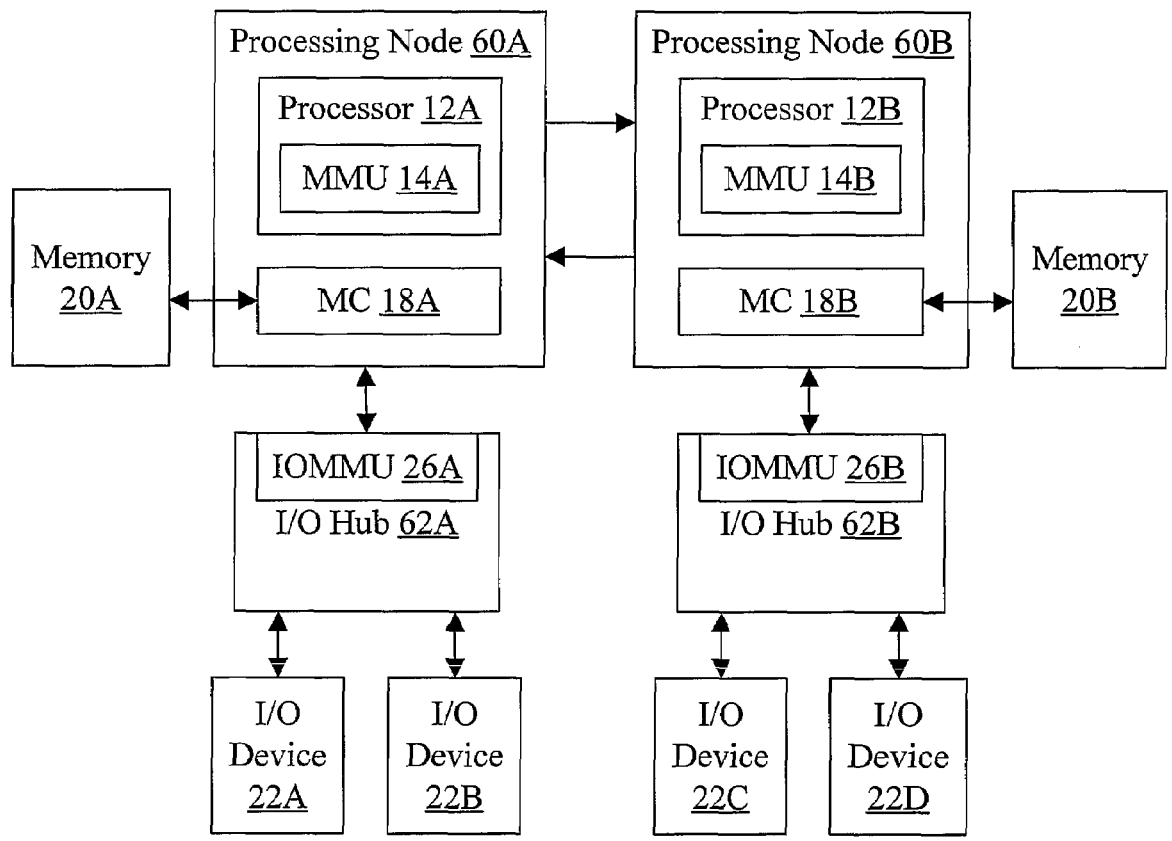
FIG. 2 is a block diagram of a more detailed embodiment of a computer system.

The system 10 illustrates high level functionality of the system, and the actual physical implementation may take many forms. For example, the MMU 14 is commonly integrated into each processor 12. FIG. 2 is one example of a more detailed embodiment. The example illustrated in FIG. 2 may be based on the HyperTransport™ (HT) coherent fabric between processor nodes and the HT I/O link between processor nodes and I/O device or I/O hubs that bridge to other peripheral interconnects. I/O hubs are shown in the example of FIG. 2. Alternatively, any other coherent interconnect may be used between processor nodes and/or any other I/O interconnect may be used between processor nodes and the I/O devices. Furthermore, another example may include processors coupled to a Northbridge, which is further coupled to memory and one or more I/O interconnects, in a traditional PC design.

In the illustrated embodiment, the system 10a comprises processing nodes 60A-60B, which respectively comprise processors 12A-12B further comprising MMUs 14A-14B. The processor nodes 60A-60B also comprise memory controllers 18A-18B. Each of processors 12A-12B may be an instance of a processor 12 as mentioned above. Similarly, each of MMUs 14A-14B and memory controllers 18A-18B may be instances of the MMU 14 and memory controller 18 shown in FIG. 1. In the illustrated embodiment, the MMU functionality is incorporated into the processor.

The system 10a includes a distributed memory system, comprising memories 20A-20B. The physical address space may be distributed over the memories 20A-20B. Accordingly, a given memory request specifying a given address is routed to the memory controller 18A or 18B coupled to the memory 20A or 20B to which that given address is assigned.

Memory requests from the I/O devices (e.g. I/O devices 22A-22D, coupled to I/O Hubs 62A-62B as illustrated in FIG. 2) may not all take the same path to arrive at the memory controller 18A-18B that will service the request. For example, the I/O devices 22A-22B may transmit memory requests to the I/O hub 62A, which transmits the requests to the processing node 60A. If the address of a given memory request is assigned to the memory 20B, the processing node 60A may transmit the given memory request to the processing node 60B, so that the memory controller 18B may receive and process the request. The I/O devices 22C-22D may transmit memory requests to the I/O Hub 62B, which may transmit the requests to the processing node 60B. If the address of a given memory request is assigned to the memory 20A, the processing node 60B may transmit the given memory request to the processing node 60A.

The IOMMU may be placed anywhere along the path between I/O-sourced memory requests and the memory 20. In the illustrated embodiment, IOMMUs 26A-26B are included in the I/O hubs 62A-62B. Thus, any memory requests sourced by an I/O device coupled to the corresponding hub may be translated by the IOMMU in the I/O hub. Other embodiments may locate the IOMMU in different places, from IOTLBs in the I/O devices to IOMMUs within the processing nodes 60A-60B, or even IOMMUs at the memory controllers 18A-18B. Still further, IOMMUs may be located at different points in different parts of the system.

Figure 3:
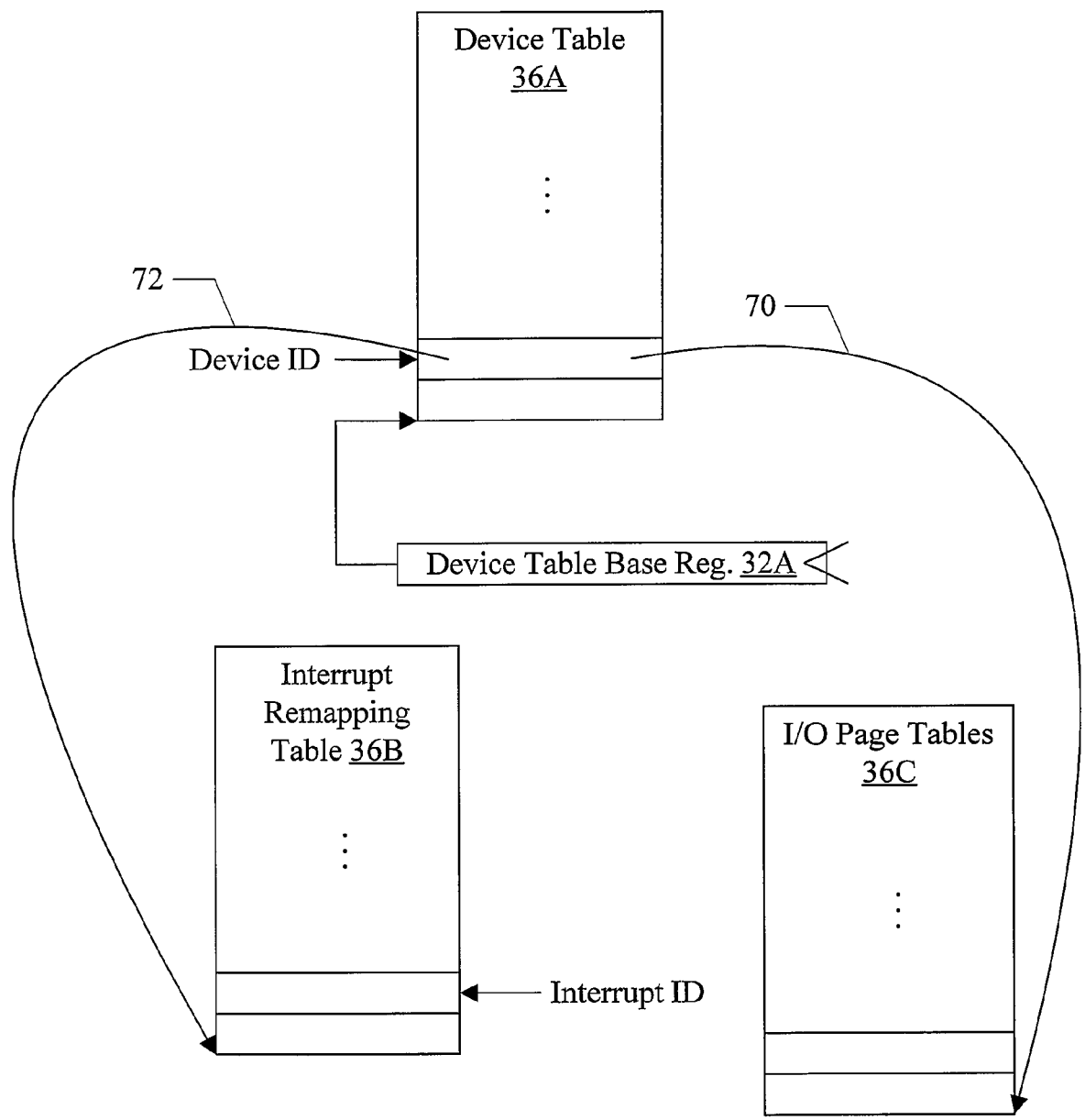
FIG. 3 is a block diagram illustrating a high level structure of one embodiment of the I/O translation tables shown in FIG. 1.

Turning now to FIG. 3, a block diagram is shown illustrating one embodiment of the I/O translation tables 36. Specifically, the translation tables 36 may include a device table 36A, an interrupt remapping table 36B, and a set of I/O page tables 36C. Also shown in FIG. 3 is one of the control registers 32 (control register 32A). The control register 32A may store a base address of the device table 36A.

The device table 36A includes a plurality of entries, indexed by a device ID assigned to the device. Thus, a given device corresponds to one of the entries in the device table 36A (unless the device has multiple device IDs, or unless the device has its traffic aggregated with others at a bridge device, and the traffic is transmitted under the bridge's device ID). The device table entry may include a variety of data. An exemplary entry is shown in FIG. 4 and described in more detail below.

Specifically, the entry may include a pointer to the I/O page tables 36C (represented by arrow 70). The pointer to the I/O page tables 36C may point to a page table that is the starting point for translation searching in the page tables 36C. The starting page table may include pointers to other page tables, in a hierarchical fashion, as mentioned above. The page tables may be indexed by various bits of the virtual address to be translated, according to the implemented translation process.

The entry may also include a pointer to the interrupt remapping table 36B (represented by arrow 72). The interrupt remapping data may be used when an interrupt request is transmitted by a device, and may be indexed by an interrupt ID. The interrupt ID may comprise data that identifies the requested interrupt, and may vary based on the mechanism used to transmit the interrupt request. For example, PCIe defines MSIs, and the interrupt is specified via the MSI data. The MSI data may comprise the interrupt ID. In HT, portions of the address specify the interrupt. The specification information may comprise, e.g., destination (e.g. processor) and vector on that processor. In some embodiments, some or all of the data forming the interrupt ID may be explicitly included in the interrupt request. In other embodiments, some or all of the data may be implicit in the interrupt request (e.g. based on the type of interrupt request, the specific interrupt requested, etc.). In still other embodiments, a combination of explicit and implicit data may be used.

It is noted that, while one device table 36A is shown, multiple device tables may be maintained if desired. The device table base address in the control register 32A may be changed to point to other device tables. Furthermore, device tables may be hierarchical, if desired, similar to the page tables described above. Similarly, while one interrupt remapping table 36B is shown, there may be multiple interrupt mapping tables, e.g. up to one per entry in the device table 36A. There may also be multiple sets of page tables, e.g. up to one per entry in the device table 36A. It is noted that other embodiments may implement interrupt remapping without I/O translation, and may implement I/O translation without interrupt remapping.

In one embodiment, at least one peripheral interconnect between the I/O devices 22 and the IOMMU 26 uses one or more address ranges in the address space on that interconnect to specify operations other than the memory operation that would be performed based on the read/write encoding of the command. The operations may be referred to as "special operations" and the corresponding address ranges may be referred to as "special operation address ranges". Some devices may be known not to generate certain operations mapped to some of the special operation address ranges. For such devices, it may be desirable to reclaim those address ranges to be usable as virtual addresses, translated through the page tables to physical addresses outside the corresponding range. For each reclaimed page, a translation may be provided in the translation tables 36 that translates the addresses in that virtual page to physical addresses mapped to the memory 20. Accordingly, the I/O device-initiated requests in those address ranges may be redirected to memory, and may perform normal memory read/write operations instead of the operation(s) assigned to that range. If a given range is used by a given device, translations for pages in that range may be established in the translation tables 36 with a unity mapping. A unity mapping may be a mapping of a virtual address to a physical address that is numerically the same as the virtual address. Pages having a unity mapping may cause the operation(s) assigned to the corresponding address range, instead of the memory operation. It is not necessary that all pages in a given range have the unity mapping or be reclaimed. The decision to reclaim or provide the unity mapping may be made on a page by page basis.

In some cases, it may be desirable to override the translation, through the I/O page tables 36C, for a special operation address range. Control fields in the device table entry for the device may be used for such ranges, as described in more detail below.

Turning now to FIG. 4, a block diagram of one embodiment of a device table entry 80 is shown. Other embodiments may implement supersets of the fields and other fields, subsets of the fields, or subsets in combination with other fields, as desired. The fields shown in FIG. 4 may be related to interrupt remapping and/or address range reclaiming, and other fields may be provided for other purposes in various embodiments. A field may comprise one or more bits, the encoding of which are assigned particular meanings when interpreted by the IOMMU 26. If a field is a single bit, for this embodiment, it is referred to as a bit. However, multibit fields for similar purposes may be used in other embodiments. Multibit fields are shown with bit ranges in FIG. 4, for this embodiment.

The Lint1P and Lint0P bits may be used to control whether legacy programmable interrupt controller (PIC) interrupt requests for Lint1 and Lint0 are blocked or passed unmodified by the IOMMU 26. If these types of interrupt requests are not expected, they may be blocked using the Lint1P and Lint0P bits. Specifically, in this embodiment, the Lint1P and Lint0P bits may be set to permit the corresponding interrupts to pass the IOMMU 26 unmodified, and may be clear to block the corresponding interrupts. In a similar fashion, the NMIP, EIntP, and INITP bits may control the passing or blocking of the non-maskable interrupt (NMI), external interrupt, and INIT interrupt, respectively. It is noted that, in this embodiment, the system management interrupt (SMI) is passed unmodified through the IOMMU 26. In other embodiments, a similar pass bit may be defined for SMI.

The IntCtl field may control how fixed and arbitrated interrupt messages are handled by the IOMMU 26. Encodings of this field may be used to specify that such interrupts are blocked, remapped using the interrupt remapping table 36B, or forwarded unmodified, in one embodiment. If blocked, the IOMMU 26 may target abort the interrupt message.

The interrupt table pointer field (IntTablePtr) may store the base address of the interrupt remapping table 36C (e.g. illustrated as arrow 72 in FIG. 3). The interrupt table length (IntTableLen) specifies the extent of the interrupt table. The interrupt table length field may be encoded for several possible lengths (e.g. 1-2048 entries in powers of two, for one embodiment). The IG bit may be used to indicate whether or not event log entries in the event log buffer 44 are to be created if an I/O page fault is detected for an interrupt message. The interrupt valid (IV) bit may indicate whether or not the Lint0P, Lint1P, IntCtl, NMIP, EintP, INITP, IntTablePtr, IG, and IntTableLen fields are valid. If the fields are not valid, the IOMMU 26 may pass all interrupts unmodified.

The SysMgt field may be encoded to provide further control of communications in the system management range. Specifically, in one embodiment, the SysMgt field may be encoded to: block requests in the range; forward requests in the range unmodified (posted writes only); forward requests that map to INTx messages unmodified (posted writes only); or translate requests using the I/O page tables 36C. The IoCtl field may be encoded to provide further control of communications in the I/O space range. Specifically, in one embodiment, the IoCtl field may be encoded to: block requests in the range; forward the requests unmodified; or translate the requests using the I/O page tables 36C.

The Domain ID is used to tag IOTLB entries and any other cache entries in the IOMMU 26 so that different devices differentiate their translation data. If devices share translation tables, they may have the same Domain ID to share cache/IOTLB entries. The Domain ID is completely under the control of software, and thus may permit flexibility for controlling software (e.g. a virtual machine monitor, or an operating system in non-virtual machine implementations) to group I/O devices into a domain to share translation data, or to separate the devices. For example, devices assigned to a given virtual machine may have the same Domain ID, and different Domain IDs may be used for different virtual machines. Any combination of separated devices and grouped devices may thus be created.

The page table pointer (PageTablePtr) is the pointer to the I/O page tables 36C (e.g. represented by arrow 70 in FIG. 3). The TV bit indicates whether or not the page translation data are valid, and the V bit indicates if the entry 80 is valid.

Turning next to FIG. 5, a block diagram of one embodiment of an I/O page table entry 82 is shown. The embodiment of FIG. 5 is defined to be compatible with the x86 and AMD64™ processor page table structures. In one particular embodiment, I/O page table entry 82 may be shared with a processor page table entry as discussed in more detail below, at some levels in the translation hierarchy.

In the illustrated embodiment, the I/O page table entry 82 is 64 bits, labeled bits 63 . . . 0 in FIG. 5. Other embodiments may have larger or smaller entries, may arrange fields differently, and/or may have different fields. Bit 63 is ignored by the IOMMU 26 in this embodiment. Bits 62 to N (where N is an integer less than or equal to 62 and greater than or equal to 52) form an archetype field 84. Bits N-1 to 52 are reserved (not used by the IOMMU 26). Bits 51 to 12 store the physical page number (the page portion of the physical address) for this embodiment. Thus, physical addresses are 52 bits in this embodiment. Other embodiments may use more or fewer bits, up to the number of bits available for the page number in the page table entry 82. Bits 11 to 9 are a next level field. Bits 8 to 1 are reserved and not used by the IOMMU 26. Bit 0 is the present bit, indicating (when set, as shown in FIG. 5) that the entry 82 is valid.

The next level field may permit a translation to skip one or more levels of the hierarchical translation mechanism. As mentioned previously, each level in the hierarchy may use different sets of virtual address bits to index the page table data structure at the level, to obtain a pointer to the next level page table (or the physical page number, if the current level is the last level). The sets of virtual address bits are non-overlapping and cover all of the translated bits (that is, excluding the page offset bits, which are the least significant bits of the virtual address and depend on the page size). However, if a given set of bits is known to have a fixed value (e.g. zero, in one embodiment) for all addresses that are generated by the I/O device, those bits need not be translated and the corresponding level in the page table hierarchy may be skipped. The next level field may be coded to indicate the next level of translation, thus identifying the next set of index bits from the virtual address that are to be selected.

In one embodiment, if the next level field is coded to binary zero, the entry 82 is the lowest level of the page table hierarchy and contains the physical page address for the page. Other encodings may specify the next level. In one implementation, there are at most six levels of hierarchy and thus the binary codings for 5 down to 1 may be used to specify the next level (since level 6 is the highest level of the hierarchy, there are no pointers to it except the page table pointers in one or more device table entries).

The archetype field 84 may indicate various attributes for the translation data and/or the corresponding data in the physical page for which the translation entry 82 provides a translation. In one embodiment, the archetype field 84 may be used for the lowest level in a hierarchical translation (e.g. the level that points to the physical page). In other embodiments, the archetype field 84 may be used at any level, and may indicate attributes for the translation data provided at that level of hierarchy or for the next consecutive lower level of the hierarchy.

By selecting attributes via the archetype field 84, software may optimize the handling of DMA traffic and/or related translation read/write traffic based on the expected patterns of use of data and/or the corresponding translations, in some embodiments. Different traffic patterns/patterns of use may be handled differently to optimize the traffic and/or the performance of the system as a whole.

For example, optimizations may be targeted toward improving throughput, overhead, and/or latency. The archetypes may specify caching policies, prefetching policies, expected reuse or lack thereof, etc. Using these attributes as hints for handling the data, the IOMMU 26 may help to improve performance, in some embodiments. Two exemplary embodiments of the archetype field 84 are shown in FIGS. 6 and 7.

Figures 6, 7:
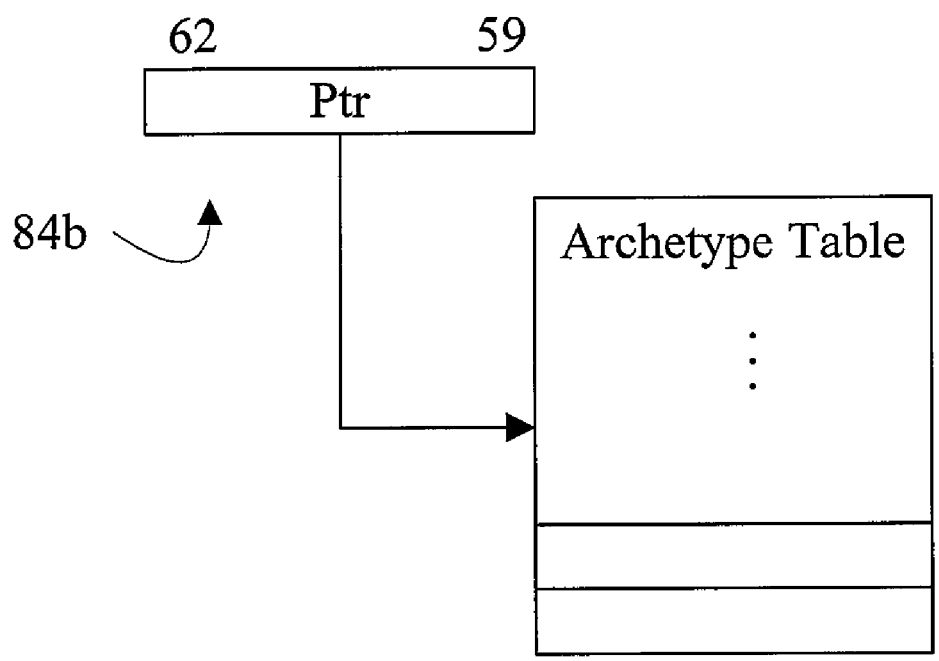
FIG. 6 is a block diagram of one embodiment of a memory archetype field shown in FIG. 5
FIG. 7 is a block diagram of a second embodiment of a memory archetype field shown in FIG. 5 and a corresponding table.

FIG. 6 is a block diagram illustrating an embodiment of the archetype field 84a. In the embodiment of FIG. 6, the archetype field 84a comprises a set of bits, where each bit specifies an attribute. Some bits may be combined to code an attribute, and thus each bit indirectly specifies an attribute in such cases. Other bits directly specify an attribute via their set and clear states. In the description below, meanings will be associated with the set and clear states of various bits. Other embodiments may use the opposite meanings of the set and clear states, as desired. Furthermore, the embodiment of FIG. 6 is merely exemplary. Subsets of the attributes, alternative attributes, and supersets of one or more attributes and other attributes may be implemented in various embodiments.

The IW and IR bits may comprise write and read permissions to the page identified by the translation, for I/O device-generated requests. The IW bit, if set, indicates write permission and the clear state indicates no write permission. The IR bit, if set, indicates read permission and the clear state indicates no read permission. If the IW or IR bits indicate permission for a given I/O device-generated request, the IOMMU 26 may permit the request to continue (translated) to memory. If the IW or IR bits indicate no permission, the IOMMU 26 may inhibit the request. For example, the request may be faulted by the IOMMU 26. Other embodiments may return an error to the I/O device, if such communication is supported.

The FC (force coherent) bit may be used to force requests to be performed coherently to the memory (if the FC bit is set). If the FC bit is clear, the IOMMU 26 may pass the coherence control from the I/O device that initiated the request (communicated using control information transmitted in the request). Alternatively, various configuration settings in the configuration registers 32 may be used to determine coherence or non-coherence (e.g. by address range, request type, etc.).

The U bit and the TR (temporal reuse bit) may be used to indicate that the translation data corresponding to this translation is not expected to be reused (U bit set) or expected to be reused frequently (TR bit set). Thus, if the U bit is set, the IOMMU 26 may not allocate memory resources within the IOMMU 26 to store the translation data (e.g. resources in the IOTLB/cache memory 30). If the TR bit is set, the IOMMU 26 may allocate the memory resources to store translation data and may optionally take steps to favor retention of the translation data over other translation data that did not have the TR bit set. If both the U bit and the TR bit is clear, the IOMMU 26 may use default allocation policies for the translation data storage.

The PF bit may be used to control prefetching of translation data. That is, if the PF bit is set, the IOMMU 26 may attempt to prefetch translation data for additional virtual pages, so that if those virtual pages are used by the I/O device for later requests, such requests may hit in the IOMMU 26 and not require a tablewalk at the time the request is received. For example, in one embodiment, the IOMMU 26 may prefetch the next sequential virtual page to the current virtual page if the PF bit is set. Other embodiments may prefetch two or more sequential virtual pages. Still further, other embodiments may implement other prefetch algorithms (e.g. by observing virtual address patterns in requests generated by a given I/O device).

The U bit, TR bit, and PF bit (or similar bits) may also be used in other embodiments to indicate cache retention policy for the data for the request itself, for target caches in the memory subsystem. Such embodiments may be particularly desirable, for example, if the IOMMU 26 is physically/logically near the memory controller (e.g. implemented on the same integrated circuit as the integrated circuit). The data placement DP bit (or a set of bits, depending on the number of levels in the caching hierarchy) may specify a cache level that should cache the data for the request. Lower level caches (e.g. L2, L3) may be used for data that is in transit and not expected to be accessed by a processor, or for data that is not expected to be accessed for a period of time. Higher level caches (e.g. L1) may be used for data that is expected to be accessed by a processor in a short period of time.

While the embodiment of FIG. 6 uses bits for each attribute, such an embodiment may be less efficient as the number of bits grows. The embodiment of FIG. 7 may be used to improve efficiency. In the embodiment of FIG. 7, the archetype field 84*b* may comprise a pointer into an archetype table 86. That is, the archetype table 86 may comprise multiple entries and the pointer may be used to select the entry.

For example, in one embodiment, the archetype table 86 may be stored in memory (e.g. the table may be part of the I/O translation tables 36). In such an embodiment, the pointer may form an offset from the base address of the table in memory. The base address of the table may be stored in the IOMMU 26 (e.g. in one of the control registers 32).

In another embodiment, the archetype table 86 may be implemented in the IOMMU 26 and the pointer may directly select an entry. For example, the table 86 may be a RAM or other volatile or non-volatile memory and the pointer may be an index into the memory. The table 86 may alternatively be implemented in a set of registers (e.g. part of the control registers 32) and the pointer may be a register number.

In the embodiment of FIG. 7, each entry in the archetype table 86 stores an indication of a set of attributes. For example, the entry may store bits similar to the embodiment of FIG. 6, specifying various attributes.

The embodiment of FIG. 7 may permit various implementations of the IOMMU 26 to implement different sets of attributes, without having to change the I/O page table entries 82 each time the supported attributes are changed. Thus, the mechanism may support flexibility in the implementation. It is noted that other page tables, such as the processor page tables or other translation tables may implement an archetype field as a pointer to a table, and thus may provide flexibility in attributes from implementation to implementation.

In yet another embodiment, the archetype field 84 may be encoded, where each encoding specifies a different fixed set of attributes. Such an embodiment may be used, e.g., where only certain subsets of the possible attribute selections are permitted together. Some combinations of attributes may not make sense (e.g. setting both the TR bit and the U bit, in the discussion of FIG. 6). Other combinations may not be supported for various implementation reasons. In such cases, the IOMMU 26 may decode the archetype field 84 to determine that attributes.

Figure 8:
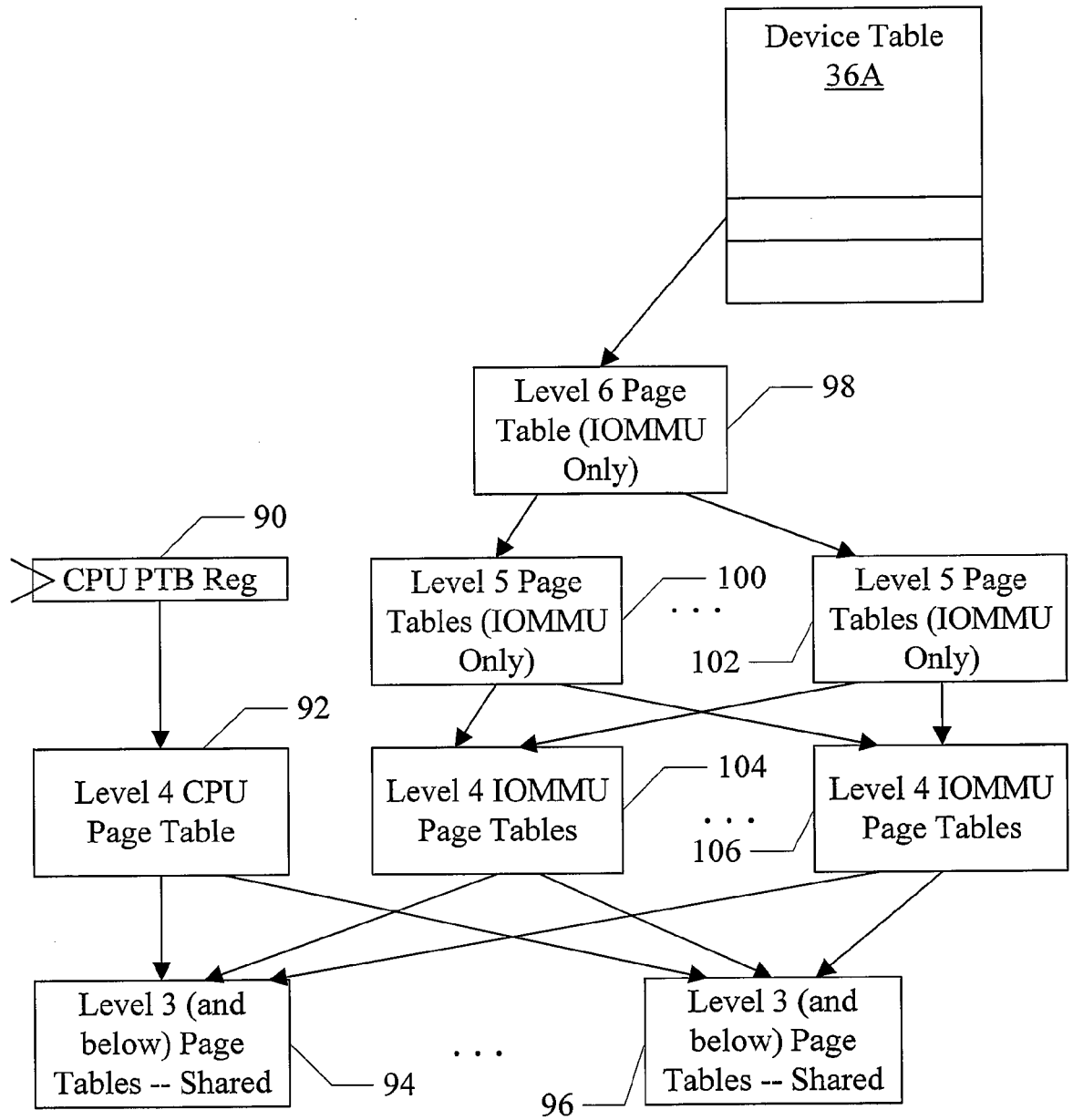
FIG. 8 is a block diagram illustrating one embodiment of sharing I/O and CPU page table entries.

Turning now to FIG. 8, a block diagram illustrating one embodiment of the sharing of page tables between the I/O translation tables 36 and the CPU translation tables 50 is shown. In the illustrated embodiment, processor virtual addresses are 48 bits and 4 levels of page tables are used (each indexed by 9 bit fields of the virtual address). Accordingly, the processor (CPU) page table base (PTB) register 90 may point to a level 4 page table for processor accesses (reference numeral 92). The processor level 4 page table 92 may point to various level 3 page tables (e.g. reference numerals 94 and 96 in FIG. 8) which may be shared with the I/O page tables.

The I/O virtual address space may implement the full 64 bit virtual address space, and thus two additional levels of page tables may be used that only the IOMMU uses. These additional levels are illustrated at reference numerals 98, 100, and 102. The device table 36A is shown and a given entry may have a page table pointer to a level 6 page table (reference numeral 98). Other entries may point to other level 6 page table (e.g. for different domain IDs) or the same level 6 page table (e.g. for the same domain ID). The level 6 page table 98 may include pointers to various level 5 page tables, as shown, which may have pointers to various level 4 page tables (e.g. reference numerals 104 and 106).

In this embodiment, the level 4 IOMMU page tables are separate from the CPU level 4 page tables. However, it is anticipated that level 4 page tables could be shared. In the illustrated embodiment, the level 4 page tables are not shared because the canonical address form required by the processor (in which address bits 63:48 must equal bit 47). With the canonical address form, the virtual addresses near the top of the virtual PO address space would map to the same physical addresses as numerically different processor virtual addresses, if the level 4 tables were shared. Specifically, the processor addresses in the range 0xFFFF_8000_0000_0000 to 0xFFFF_FFFF_FFFF_FFFF would map to the same physical addresses as I/O virtual addresses in the range 0x8000_0000_0000_0000 and 0xFFFF_FFFF_FFFF_FFFF. If software can manage this mapping, then the level 4 tables can be shared. Otherwise, the separate level 4 tables may be used. In other embodiments that do not implement the canonical address form, shared page tables may be used. Additionally, more or less page table sharing may be implemented based on the number of virtual address bits implemented in the processor.

Not shown in FIG. 8 is the skipping of page table levels in the I/O page table data structures. However, such level skipping may be supported, as mentioned previously.

FIG. 9 illustrates the I/O page table entry 82 (reproduced from FIG. 5) and a CPU page table entry 120 that is compatible with the AMD64™ instruction set architecture. FIG. 9 illustrates how the page table entries 82 and 120 may be shared. Bit 63 of the CPU page table entry 120 is a no execute (NX) bit. Bit 63 of the I/O page table entry 82 is ignored, and thus does not conflict with the NX bit. The archetype field of the I/O page table entry 82 occupies bits that are "available" (not used) in the CPU page table entry 120. That is, the processor does not interpret the bits in the available field and thus the archetype field may be coded as desired. The address field occupies the same set of bits in both page table entries. The NxtLvl field of the I/O page table entry 82 also occupies a set of available bits (AVL) in the CPU page table entry 120. The attributes field of the CPU page table entry 120 occupies reserved bits in the I/O page table entry 82, and the present bit is bit 0 for both entries.

Accordingly, for sharing an entry as both an I/O page table entry 82 and the CPU page table entry 120, the NxtLvl field should be coded to select the next consecutive lower level in the page table hierarchy for each shared entry. Also, if the archetype field is coded correctly, optimizations of the DMA traffic may be implemented.

Figure 10:
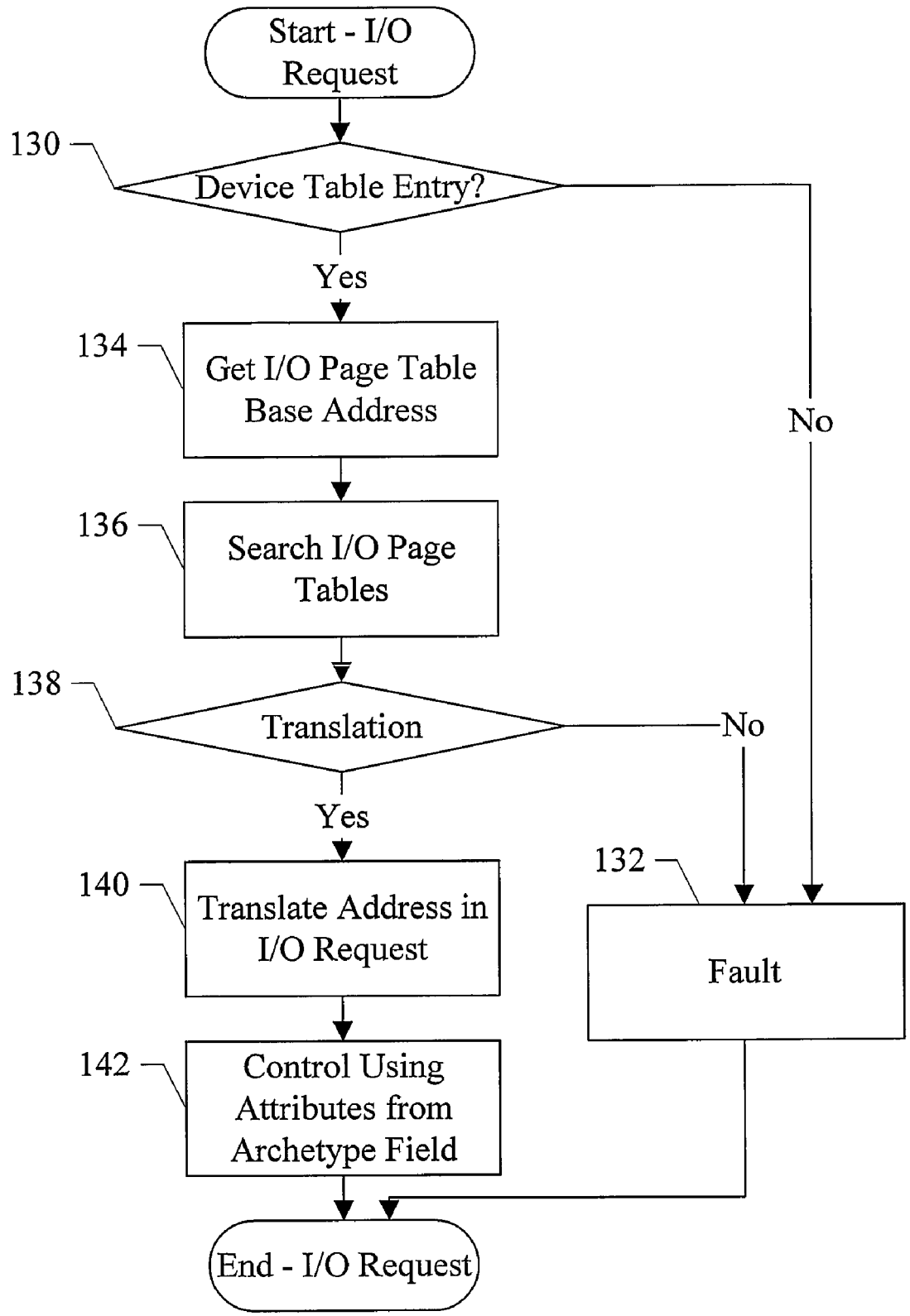
FIG. 10 is a flowchart illustrating one embodiment of a method of translating an I/O device-generated request.

Turning now to FIG. 10, a flowchart illustrating one embodiment of a method of translating an I/O device-generated request is shown. The method may be performed, e.g., by the IOMMU 26 and more specifically by the control logic 34. While blocks are shown in a particular order for ease of understanding, other orders may be used. Blocks may be performed in parallel in combinatorial logic in the control logic 34. Blocks, combinations of blocks, and/or the flowchart as a whole may be pipelined over multiple clock cycles.

In response to receiving an I/O device-generated request, the IOMMU 26 may determine if a valid device table entry exists in the device table 36A (decision block 130). If a valid device table entry does not exist (decision block 130, "no" leg), the IOMMU 26 may fault the request (block 132). If a valid device table entry does exist (decision block 130, "yes" leg), the IOMMU 26 may obtain the I/O page table base address from the device table entry (block 134). The IOMMU 26 may search the I/O page tables for a translation for the virtual address in the request (block 136). If a valid translation is not found (decision block 138, "no" leg), the IOMMU 26 may fault the request (block 132). If a valid translation is found (decision block 138, "yes" leg), the IOMMU 26 may translate the virtual address in the request to the corresponding physical address (block 140). Other control operations maybe implemented according to the archetype field (block 142). For example, the translation data and/or the transferred data may be controlled according to the attributes.

It is noted that the effect of blocks 130, 132, 134, 136, and 138 may be achieved using one or more IOTLB/cache lookups in the IOMMU 26 for a given transaction.

Numerous variations and modifications will become apparent to those skilled in the art once the above disclosure is fully appreciated. It is intended that the following claims be interpreted to embrace all such variations and modifications.

What is claimed is:

1. An input/output (I/O) memory management unit (IOMMU) comprising:
    at least one memory configured to store translation data; and
    control logic coupled to the memory and configured to translate an I/O device-generated memory request using the translation data, and wherein the translation data corresponds to: (i) one or more device table entries in a device table stored in a memory system of a computer system that includes the IOMMU, wherein the device table entry for a given request is selected by an identifier corresponding to the I/O device that generates the request; and (ii) one or more I/O page tables, wherein the selected device table entry for the given request includes a pointer to a set of I/O page tables to be used to translate the given request, and wherein the selected device table entry for the given request further comprises a second pointer to an interrupt remapping table that stores data for remapping interrupts signalled by the I/O device, wherein the control logic is configured to remap a first interrupt signalled by the I/O device responsive to receiving the first interrupt in the IOMMU and further responsive to the data in the selected device table entry.

2. The IOMMU as recited in claim 1 wherein the selected device table entry further comprises one or more control fields indicating how specific interrupts are to be handled.

3. The IOMMU as recited in claim 1 wherein the device table entry further comprises a domain identifier, and wherein two or more I/O devices are grouped into one group for accessing the I/O page tables by assigning the same domain identifier to the device table entries for the two or more I/O devices.

4. The IOMMU as recited in claim 3 wherein two or more I/O devices are separated and use separate I/O translation data structures if the domain identifiers in the devices' device table entries differ.

5. The IOMMU as recited in claim 1 wherein the one or more I/O page tables are structured hierarchically, and wherein each level is indexed by different subsets of virtual address bits from the I/O device-generated memory request, and wherein each I/O page table entry includes a next level field identifying the next level in the hierarchy, wherein one or more levels in the hierarchy are skippable via encodings of the next level field.

6. A system comprising:
    a memory system storing a device table and one or more input/output (I/O) page tables during use;
    a least one I/O device configured to generate a memory request;
    an I/O memory management unit (IOMMU) coupled to the I/O device and to the memory system, wherein the IOMMU is configured to translate the memory request using translation data, and wherein the translation data corresponds to: (i) one or more device table entries in the device table, wherein the device table entry for a given request is selected by an identifier corresponding to the I/O device; and (ii) one or more I/O page tables, wherein the selected device table entry for the given request includes a pointer to a set of I/O page tables to be used to translate the given request;
    a processor coupled to the memory system, wherein the memory system is configured to store a set of processor page tables to translate memory requests issued by the processor, and wherein one or more page tables of the set of processor page tables are shared with the I/O page tables and;
    wherein the device table entry for the given request further comprises a second pointer to an interrupt remapping table that stores data for remapping interrupts signalled by the I/O device.

7. The system as recited in claim 6 wherein the selected device table entry further comprises one or more control fields indicating how specific interrupts are to be handled.

8. The system as recited in claim 6 wherein the device table entry further comprises a domain identifier, and wherein two or more I/O devices are grouped into one group for accessing the I/O page tables by assigning the same domain identifier to the device table entries for the two or more I/O devices.

9. The system as recited in claim 8 wherein two or more I/O devices are separated and use separate I/O translation data structures if the domain identifiers in the devices' device table entries differ.

10. The system as recited in claim 6 wherein the one or more I/O page tables are structured hierarchically, and wherein each level is indexed by different subsets of virtual address bits from the I/O device-generated memory request, and wherein each I/O page table entry includes a next level field identifying the next level in the hierarchy, wherein one or more levels in the hierarchy are skippable via encodings of the next level field.

11. The system as recited in claim 6 wherein fields used by the processor but not the IOMMU are defined as not used in the I/O page table definition.

12. The system as recited in claim 11 wherein fields used by the IOMMU but not the processor are defined as not used in the processor page table definition.

13. A method comprising:
- receiving an input/output (I/O) device-generated memory request in an IOMMU;
- determining a device table entry corresponding to the memory request by the IOMMU;
- determining a set of I/O page tables corresponding to the memory request responsive to the device table entry;
- translating the memory request using translation data corresponding to the device table entry and the set of I/O page tables;
- determining an interrupt remapping table corresponding to the I/O device responsive to the device table entry; and
- remapping an interrupt signalled by the I/O device using the interrupt remapping table.

14. The method as recited in claim 13 further comprising, if a device table entry does not exist for the memory request, causing a fault.

15. The method as recited in claim 13 further comprising, if the translating fails, causing a fault.

16. The method as recited in claim 13 further comprising translating memory requests issued by a processor using a set of processor page tables, wherein one or more page tables of the set of processor page tables are shared with the I/O page tables.

17. The method as recited in claim 16 wherein fields used by the processor but not the IOMMU are defined as not used in the I/O page table definition.

18. The method as recited in claim 13 wherein fields used by the IOMMU but not the processor are defined as not used in the processor page table definition.

19. The method as recited in claim 13 wherein the device table entry further comprises a domain identifier, the method further comprising:
- grouping two or more I/O devices into one group for accessing the I/O page tables by assigning the same domain identifier to the device table entries for the two or more I/O devices; and
- separating two or more other I/O devices for accessing the I/O page tables using separate I/O translation data structures by assigning different domain identifiers in the devices' device table entries.

* * * * *

UNITED STATES PATENT AND TRADEMARK OFFICE
CERTIFICATE OF CORRECTION

PATENT NO. : 7,653,803 B2  Page 1 of 1
APPLICATION NO. : 11/623500
DATED : January 26, 2010
INVENTOR(S) : Hummel et al.

It is certified that error appears in the above-identified patent and that said Letters Patent is hereby corrected as shown below:

Claim 18, col. 16, line 9, please delete "13" and replace with --17-- after claim.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,653,803 B2
APPLICATION NO. : 11/623500
DATED : January 26, 2010
INVENTOR(S) : Hummel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 456 days.

Signed and Sealed this

Twenty-third Day of November, 2010

David J. Kappos
*Director of the United States Patent and Trademark Office*